2,841,621
ALKENYLOXYPOLYETHOXYETHYL ALKYL ETHERS

Gerard C. Riley, Philadelphia, Pa., assignor to Rohm & Haas Company, Philadelphia, Pa., a corporation of Delaware No Drawing. Application May 22, 1956
Serial No. 586,355

8 Claims. (Cl. 260—615)

This invention deals with specific alkenyloxypolyethoxyethyl alkyl ethers and to a method for their preparation.

The ethers of this invention may be represented by the formula $$RCH_2CH=CHCH_2(OCH_2CH_2)_nOR°$$

in which R is an alkyl group of four to twelve carbon atoms, preferably five to nine carbon atoms, R° is an alkyl group of one to two carbon atoms, and $n$ is an integer of five to twenty.

Typical of the groups representing R include butyl, pentyl, hexyl, octyl, decyl, and dodecyl. R may have any possible spatial configuration, but it preferably has a branched chain structure. For instance, when R is an octyl group it may be n-octyl, isooctyl, 3-methylheptyl, 3,6-dimethylhexyl, 4-ethylhexyl, 2-methyl-3-ethylpentyl, 1,3-diethylbutyl, 1,1,3,3-tetramethylbutyl, and the like.

R° is a methyl or ethyl group.

The compounds of this invention are prepared by bringing together at a reacting temperature an alkenyl halide having the formula $$RCH_2CH=CHCH_2X$$

in which X is an atom of chlorine, bromine, or iodine, and R has the same significance as above, with an ether alcohol having the formula $$HO(C_2H_4O)_nR°$$

in which $n$ and R° have the same significance as above, in the presence of a hydrogen halide accepting agent, preferably a strong base, such as sodium, potassium, or lithium oxide or hydroxide, or the like.

The present reaction is conveniently carried out by mixing a defined alkenyl halide and a defined ether alcohol, preferably in substantially equimolecular proportions, since reaction occurs in such a ratio, with enough of the strong base present to take up the theoretical amounts of hydrogen halide formed. Reaction is achieved by heating the above mixture in the temperature range of about 80° to 125° C. The salt formed during the reaction may be readily removed by taking up the reaction mixture in an organic solvent such as benzene or toluene, removing the salt, such as by filtration, and isolating the desired alkenyl-polyethoxyethyl alkyl ether by removing the solvent, such as by distillation, preferably under reduced pressure.

As an alkenyl halide, there may be used any of those having the formula $$RCH_2CH=CHCH_2X$$

These halides are available through the reaction of butadiene and an alkyl halide of four to twelve carbon atoms, such as tert-butyl halide, tert-amyl halide, diisobutyl halide, isononyl halide, dodecyl halide, or the like. The branched chain members are especially valuable for the present purposes.

As ether alcohol reactants there are used the monomethyl or monoethyl ethers of polyethylene glycols having five to twenty ethylene groups. These reactants are readily available through the reaction of methanol or ethanol and ethylene oxide. The reaction products are principally single compounds but there may, also, be present some compounds with fewer or more ether groups, within the present definition. Single compounds or mixtures of compounds are quite satisfactory for the present purposes.

The present products are valuable detergents that exhibit no or very low foam in aqueous systems and demonstrate remarkable color and chemical stability in alkaline systems.

In the standard Fineman hard surface detergency tests the present compounds consistently achieve values of 90 to 95% and above both as to soil removal and prevention of soil redeposition. In many commercial applications it is desirable, especially in situations involving stubborn cleaning conditions, to employ alkaline builders such as alkali, soda ash, silicates, borates, and the like, in addition to a detergent. In particular, strong alkaline builders are advantageous in dairy equipment formulations, janitorial scrub soaps, and paint stripping solutions, among others. The present products, because of their unusual color and chemical stability in the presence of alkaline builders, are valuable in the above-stated and similar situations. Over prolonged periods of time the present products, in alkaline built formulations, maintain their characteristic light amber to straw color and markedly effective detergent properties. In contrast to this and distinct therefrom, the alcohols corresponding to the subject ethers are highly unstable in alkaline built formulations, so that immediately after formulation these alcohols exhibit their instability by rapidly changing from their characteristic light yellow transparency to a dark brown opacity, with concurrent and considerable diminution in detersive qualities. This instability prevents the use of the alcohols in alkaline-built formulations in which the present corresponding ethers excel.

The compounds of this invention consistently exhibit no or very low foam in aqueous systems. In the standard Ross-Miles foam test conducted with 0.1% aqueous solutions of the alkenyloxy-polyethoxyethyl alkyl ethers of this invention, measured at 27° C., there are consistently obtained foam values ranging from 0.0 to 3.0 cm., frequently ranging from 0.0 to less than 1.0 cm. The corresponding alcohols foam very readily and voluminously and consistently give values at least five times greater than the highest foam values of the present compounds. This difference in foam qualities is quite significant particularly in many commercial and residential applications, especially mechanical dishwashing. In such instances the foaming of a detergent adversely affects the cleansing operation, because such a characteristic reduces the speed of the rotor on which the distribution of the detergent depends. Detergents that foam appreciably are, therefore, at least highly undesirable and generally unusable. The compounds of this invention in a standard mechanical dishwasher test, in which water alone permits a rotor speed of 100 R. P. M., consistenly give values over 90 up to 100 R. P. M., while exhibiting excellent detersive properties. In contrast, the alcohols corresponding to the instant ethers consistently give values well below 50 R. P. M., frequently down to the point where the rotor stalls, while detergency falls off critically to the point where no cleaning at all is achieved. This excessive foaming characteristic bars the use of these alcohols in applications of the sort set forth in which the present products perform meritoriously.

The cloud points of the present compounds are quite satisfactory. They range from well above room temperature up to about 80° C. and above, generally increasing with increased ethylene oxide content.

This application is a continuation-in-part of my application Serial Number 354,645, filed May 12, 1953, and now abandoned.

The unique compounds of this invention as well as the method for preparing them will be more clearly understood from the following examples that are offered by way of illustration and not by way of limitation. Parts by weight are used unless otherwise indicated.

*Example 1*

A reaction vessel is charged with 616 parts of the monomethyl ether of hexaethylene glycol. While the vessel is heated and the charge well stirred, powdered sodium hydroxide to a total of 120 parts is added. With the temperature of the charge at 95°–100° C. the sodium hydroxide is soon dissolved. Thereupon an octenyl chloride of the formula $$(CH_3)_3CCH_2CH=CHCH_2Cl$$

is slowly added with good stirring while the temperature is maintained between 100° and 105° C. When a total of 324 parts of this chloride has been added, stirring is continued for three hours at 95°–100° C. There are then added 1000 parts of toluene and 500 parts of water. The resulting mixture is well stirred for about 20 minutes and then allowed to form layers. The aqueous layer containing salt is separated and discarded. The solvent layer is subjected to distillation under reduced pressure. There is obtained a residue of 770 parts of an amber oil, which is soluble in water and which corresponds in composition to $$RCH_2CH=CHCH_2(OCH_2CH_2)_6OCH_3$$

The yield is 92%. Its solutions in water have reduced surface tensions. A 0.5% solution gives a Draves wetting time of 15 seconds. A wetting time of 25 seconds is obtained at 0.039% concentration in distilled water and at 0.052% concentration in aqueous 2% sodium hydroxide solution. In Fineman hard surface detergency tests soil removals of 95% are obtained on glass, nylon, and steel. Yet this compound produces very little foam.

A somewhat better detergent and wetting agent is obtained by substituting tert.-$C_5H_{11}CH_2CH=CHCH_2Cl$ for the above tert.-$C_4H_9CH_2CH=CHCH_2Cl$ in the above procedure.

*Example 2*

In the same way there are reacted 868 parts of the monomethyl ether of nonaethylene glycol, 120 parts of sodium hydroxide, and 575 parts of the dodecenyl chloride, $C_8H_{17}CH_2CH=CHCH_2Cl$. Salt is removed by diluting the reaction mixture with 1500 parts of toluene and filtering. The filtrate is stripped to give 980 parts of a water-soluble oil, an 82% yield of $$C_{12}H_{23}(OCH_2CH_2)_9OCH_3$$

The aqueous solutions of this compound are surface active. They give rapid wetting and provide effective cleaning action. Yet foam therefrom is very low, thus permitting their use in mechanical treating processes where foam is objectionable. Also, the compounds are stable when compounded with such alkaline builders as soda ash, sodium silicates, borax, sodium phosphates, and the like.

Repetition of the above procedure with the comparable dodecenyl bromide and iodide yields a product identical with that above.

The above procedure is repeated with substitution of 890 parts of the monoethyl ether of nonaethylene glycol. The end product is very similar to that above, giving solutions having rapid wetting action and low foam.

Repetition of the above procedure with the alkenyl chloride $(CH_3)_3CCH_2C(CH_3)_2CCH_2CH=CHCH_2Cl$ and the monomethyl ether of polyethylene glycols having an average ethylene group content of 9.1 yields a product having the average composition $$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-CH_2CH=CHCH_2(OCH_2CH_2)_{9.1}OCH_3$$

This gives a 25 second wetting out time at 0.079% in distilled water and at 0.057% in aqueous 2% sodium hydroxide solution. A comparable alkylbenzylpolyether gives wetting times of 25 second at 0.19% and 0.21%, respectively.

*Example 3*

The procedure of Example 2 is followed with substitution of an equivalent amount of the monomethyl ether of octaethylene glycol. The product is a water-soluble oil. An aqueous 0.062% solution thereof gives a Draves wetting time of 25 seconds. A 0.060% solution in 2% sodium hydroxide solution gives a wetting time of 25 seconds. The mixtures with alkaline builders are stable. Hard surface detergency with such mixtures is above 90%.

*Example 4*

The procedure of Examples 2 and 3 is repeated with substitution of an equivalent amount of the monomethyl ether of a mixture of polyethylene glycols having an average ethylene group content of 10.8. The product is very much like the previous products. A wetting time of 25 seconds by the Draves test is obtained at a concentration of 0.092% in 2% sodium hydroxide solution. Mixtures with alkaline builders are stable.

In the same way there may be prepared compounds of this same type having up to 20 ethylene groups. As the polyether chain is lengthened, the products retain their characteristics of good wetting coupled with low foaming and stability in admixture with alkaline builders. Hard surface detergency remains above 90% for such mixtures. A comparable alkylbenzyl compound gives a detergency value under the same conditions of 82%.

*Example 5*

In the same way as above 280 parts of the monomethyl ether of dodecaethylene glycol is heated in a reaction vessel to about 100° C. while 25 parts of powdered sodium hydroxide is added thereto. There is then slowly added 130 parts of an alkenyl chloride of the formula $$C_{12}H_{25}CH_2CH=CHCH_2Cl$$

where the $C_{12}H_{25}$ is branch-chained, being derived from olefins. The mixture is heated at 100°–105° C. for five hours. The reaction mixture is then taken up in toluene and filtered. The filtrate is stripped to give an oil which is soluble in water. The solutions have low surface tension, give rapid wetting out, provide good detergent action, and give little foam.

The compounds of this invention have not only the desirable characteristics already described, including good wetting out, low foaming, stability in alkaline formulations, and good detergency, but also other valuable properties, including favorable emulsifying characteristics, compatability with strong brines, such as calcium chloride solutions, and high cloud points for aqueous solutions. The surprising concomitance of these valuable properties makes the present products very useful in a multitude of practical applications, many of which are unavailable to somewhat structurally similar compounds that lack this unusual concurrence of exceptional properties.

I claim:

1. Compounds of the formula $$RCH_2CH=CHCH_2(OCH_2CH_2)_nOR°$$

where R is an alkyl group of four to twelve carbon atoms, R° is an alkyl group of not over two carbon atoms, and n is an integer from five to twenty.

2. Compounds of the formula $$RCH_2CH=CHCH_2(OCH_2CH_2)_nOCH_3$$

where R is an alkyl group of four to twelve carbon atoms and $n$ is an integer from five to twenty.

3. A compound of the formula

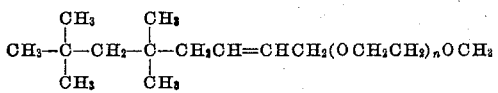

where $n$ is an integer from five to twenty.

4. A compound of the formula of claim 3 wherein $n$ has a value of six.

5. A compound of the formula of claim 3 wherein $n$ has a value of eight.

6. A compound of the formula of claim 3 wherein $n$ has a value of nine.

7. A compound of the formula

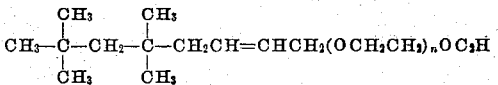

wherein $n$ is an integer from five to twenty.

8. A compound of the formula of claim 7 wherein $n$ has a value of nine.

References Cited in the file of this patent

UNITED STATES PATENTS

| | | |
|---|---|---|
| 2,042,219 | Groll et al. | May 26, 1936 |
| 2,520,733 | Morris et al. | Aug. 29, 1950 |
| 2,624,766 | Butler | Jan. 6, 1953 |